No. 619,028. Patented Feb. 7, 1899.
C. W. THOMPSON.
ELECTROCHRONOGRAPH.
(Application filed June 27, 1898.)
(No Model.)
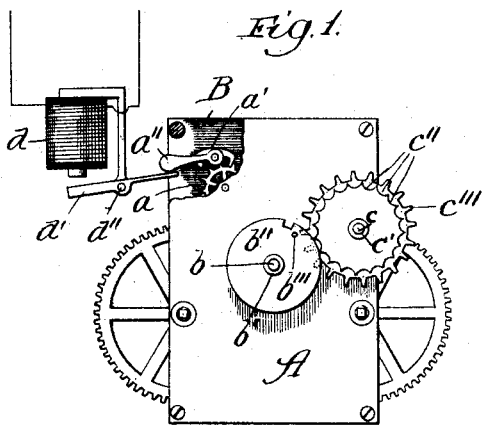
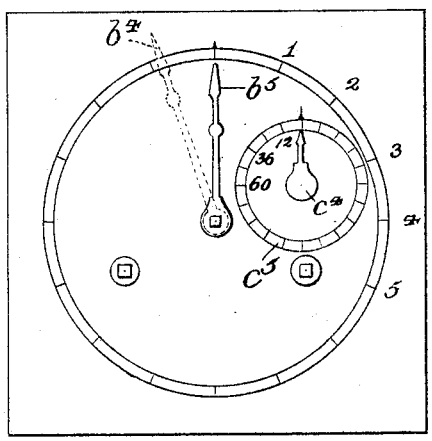
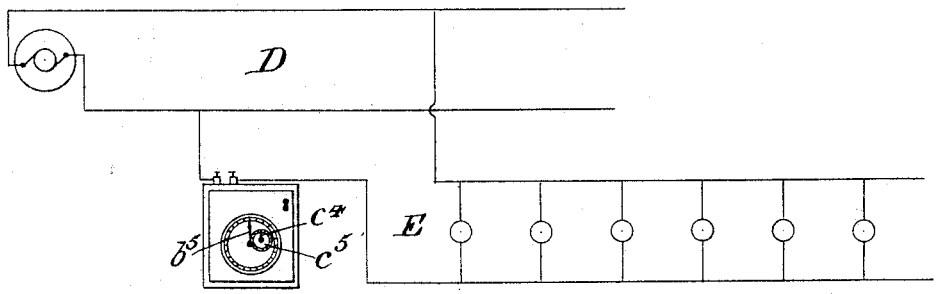
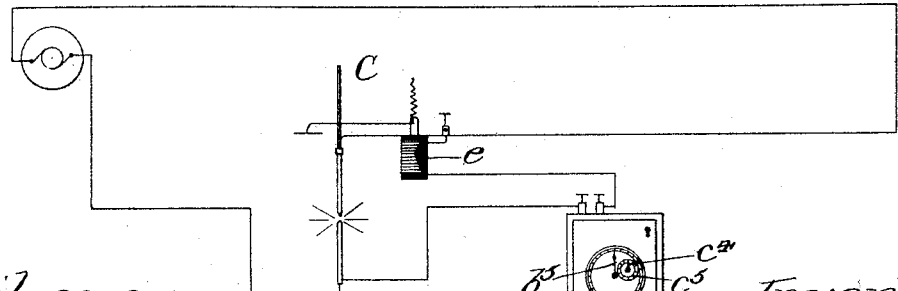
Witnesses:
Inventor:
Clark W. Thompson

UNITED STATES PATENT OFFICE.

CLARK W. THOMPSON, OF LA CROSSE, WISCONSIN.

ELECTROCHRONOGRAPH.

SPECIFICATION forming part of Letters Patent No. 619,028, dated February 7, 1899.

Application filed June 27, 1898. Serial No. 684,578. (No model.)

*To all whom it may concern:*

Be it known that I, CLARK W. THOMPSON, a citizen of the United States, residing at La Crosse, in the county of La Crosse and State of Wisconsin, have invented a new and useful electrochronograph or measurer and recorder of time during which an electric circuit, with which my device may be associated, is energized, of which the following is a specification.

My invention relates to electrochronographs that are designed to measure and record intervals of time during which an electric circuit, of which my recorder may form a part, is energized, a number of such intervals being recorded in an aggregate amount, so that the total number of hours, minutes, and seconds during which the circuit is energized at different times may be ascertained. I attain these objects by the mechanism illustrated in the accompanying drawings, in which—

Figure 1 is a front view showing a part of the mechanism of my invention with the indicating-hand and face removed. Fig. 2 is a similar view with the face, index, and indicating hands in place. Fig. 3 is a diagrammatic representation of a constant-potential circuit D, showing the method of connecting my recorder in a branch circuit E thereof containing constant-potential translating devices, such as incandescent lamps, motors, and the like. Fig. 4 is a diagram with my recorder connected in circuit with a constant-current device, such as an arc-lamp C or the like.

Similar letters refer to similar parts throughout the several views.

The housing-plates A B contain and support an ordinary clock mechanism. The outer plate, being broken away, exposes the verge-wheel $a$, the verge $a'$, and the verge balance-lever $a''$. Around the minute-hand arbor $b$ of the ordinary clock mechanism I place the hollow hour-hand arbor $b'$, which has attached to its lower end the notched disk $b''$, which disk carries the pin $b'''$. To one side of the disk-arbor $b'$ I mount on an independent arbor $c$ a hollow arbor $c'$, which carries in a fixed relation the two notched wheels $c''$ and $c'''$. As will be seen, every time the disk $b''$ makes one revolution the system comprising arbor $c'$, wheels $c'' c'''$, and index-hand $c^4$ will move one notch and the hand $c^4$ will indicate twelve hours. The hands $c^4$ and $b^5$ are the ordinary minute and hour hands of a clock, the index-hand $c^4$ being designed to indicate the number of revolutions made by the hour-hand $b^5$. An electromagnet $d$ may be wound with just enough ampere-turns sufficient to raise its armature $d'$, which is swung on pivot $d''$.

My device is in no sense a meter for the electric current; but it is a recorder of the time that the electric current flows in a circuit with which the device may be associated.

As illustrated in Fig. 3, the magnet $d$ should be wound with wire large enough to safely carry current for six incandescent lamps. When placed in circuit, as shown in Figs. 3 and 4, the operation of the device is as follows: The current flowing in the circuit and around the magnet $d$ causes the armature $d'$ to be lifted, when its extended end will be withdrawn from the path of the balance-lever $a''$. The armature $d'$ will be held in this position as long as the electromagnet $d$ remains energized. The lever $a''$ being free to move, the clock mechanism will immediately be set in motion by the motor-springs and will continue until the operation is arrested again by the armature $d'$ falling away from the magnet $d$, which will promptly take place as soon as the magnet $d$ is deënergized. The outer end of the armature is heavier than the extended end and will overbalance it whenever there is no magnetic attraction to hold it up. The clock will continue to run as long as the armature $d'$ is held up, and will thus record in hours and minutes the length of time the circuit is maintained. Each time the circuit is closed the clock will start and record the time the circuit remains closed and each record will be added to the preceding record.

It will be noticed that the armature $d'$ holds the lever $a''$ up and that the verge $a'$ bears against the verge-wheel $a$ at a time when the tension of the balance-spring is in a strained condition, so that when the lever $a''$ is released the mechanism of the clock is assisted in starting by the operation of the balance-spring, and hence the clock will never fail to start as soon as the current in the magnet ceases to flow.

Fig. 4 shows diagrammatically an arc-lamp C in circuit and my recorder in electric series circuit with the shunt-coil $e$ thereof. The recorder could be placed in series with the main branch circuit of the lamp within the switch-terminals in the same way as shown in Fig. 3. It may be more conveniently wound when placed in circuit, as shown in Fig. 4.

My electrochronograph is especially adapted to record the length of time that an electric current is used in a circuit with which my chronograph or time-recorder is associated. For instance, it will record in hours and minutes the aggregate time that an electric motor is kept in operation or a single or a number of arc or incandescent lamps may be kept burning during a specified period or a number of periods.

Having described my invention and reserved to myself all proper use thereof, what I claim, and desire to secure by Letters Patent, is—

The combination with a clock-movement, of a notched wheel $b''$ attached to the hour-hand arbor thereof, a pin $b'''$ carried thereby, the toothed wheels $c''$ $c'''$ adapted to be operated by the said wheel $b''$, by means of the said notch and pin carried thereby, a hollow arbor $c'$ carrying an index-hand $c^4$, and index $c^5$, and an electromagnet $d$, adapted to set the operative mechanism in motion when a current is flowing through the said magnet, and to stop the operative mechanism when the current ceases to flow through the said electromagnet, substantially as shown and described.

CLARK W. THOMPSON.

Witnesses:
EMIL KRIEBEL,
GEO M. ERICKSON.